United States Patent [19]

Sternung et al.

[11] 3,821,484

[45] June 28, 1974

[54] TIME SHARING OF A SUPERVISORY RECEIVER UNIT

[75] Inventors: Sven Y. Sternung; Earl T. Cowden, both of Galion, Ohio

[73] Assignee: North Electric Company, Galion, Ohio

[22] Filed: Nov. 15, 1972

[21] Appl. No.: 306,842

Related U.S. Application Data

[63] Continuation of Ser. No. 124,233, March 15, 1971, abandoned.

[52] U.S. Cl. ........ 179/18 EB, 179/18 T, 179/84 UF

[51] Int. Cl. ........ H04m 3/22

[58] Field of Search ......... 179/84 UF, 2 DP, 15 BY, 179/18 EB, 18 FF, 16 EC, 15 AT, 18 T

[56] References Cited

UNITED STATES PATENTS

| | | | |
|---|---|---|---|
| 3,223,783 | 12/1965 | Yamamoto | 179/84 UF |
| 3,259,697 | 7/1966 | Brumfield | 179/16 EC |
| 3,519,758 | 7/1970 | Gfeller | 179/84 UF |
| 3,524,946 | 8/1970 | Pinet | 179/15 AT |
| 3,532,827 | 10/1970 | Ewin | 179/18 FF |
| 3,578,919 | 5/1971 | O'Neill | 179/84 UF |
| 3,582,562 | 6/1971 | Sellari | 179/84 UF |
| 3,582,565 | 6/1971 | Beeman | 179/84 UF |
| 3,609,248 | 9/1971 | Wolf | 179/84 UF |
| 3,641,272 | 2/1972 | Pinet | 179/15 AT |

*Primary Examiner*—Kathleen H. Claffy
*Assistant Examiner*—David L. Stewart
*Attorney, Agent, or Firm*—Johnson, Dienner, Emrich, Verbeck & Wagner

[57] ABSTRACT

Supervisory receiver units are connected as time shared detectors to continually monitor all incoming lines and trunks of an automatic telephone system to determine the presence of supervisory tone signals, such as seize, release, recall, and acknowledge. Each supervisory receiver unit is dedicated to an associated group of eight terminals, with each terminal being monitored for a corresponding part of a scanning cycle. As the scan of each terminal is completed, the detection results are relayed to a processor. Such action continues until the entire group is scanned.

16 Claims, 3 Drawing Figures

INVENTORS
SVEN Y. STERNUNG
EARL T. COWDEN

BY Johnson Dienner Emrich Verbeck + Wagner
ATTORNEYS

DETECTOR CIRCUIT 162

INVENTORS
SVEN Y. STERNUNG
EARL T. COWDEN

BY Johnson Dienner Emrich Verbeck & Wagner
ATTORNEYS

INVENTORS
SVEN Y. STERNUNG
EARL T. COWDEN

BY Johnson Dienner Emrich Verbeck & Wagner
ATTORNEYS

TIME SHARING OF A SUPERVISORY RECEIVER UNIT

This is a continuation of application, Ser. No. 124,233, filed Mar. 15, 1971 and now abandoned.

GOVERNMENT CONTRACT

The invention herein claimed was made in the course of, or under contract with, the Department of the Army.

BACKGROUND OF THE INVENTION

1. Field of the Invention

The invention relates to supervisory receiver units (SRU) for servicing a plurality of lines over which voice frequency is used to provide signalling and supervision.

The SRU is a universal receiver that receives voice frequency signals. Through an interface with a digital processor, these voice frequency signals are interpreted in a predetermined manner. Although interpretation of the signals is accomplished in the digital processor, the receiver is required to inform the processor as to which analog signal is present, and in this respect, acts as an analog-to-digital converter.

The use of voice frequency signal receivers as opposed to any other kind of receiver is the result of an historic evolution, so that in many telecommunication systems of today, voice frequency is used for signalling and supervision purposes. This is particularly true in a military environment. In a commercial telephone system, it is common for a subscriber line to be tied to the central office with physical wires. However, in the military, where land lines or physical lines are not readily available, the user has to resort to radio links and other non-metallic communication links, resulting in a variety of interface problems. To minimize such problems voice frequency signalling interface is used.

It is the experience of the field, however, that the use of voice frequency signalling puts a more severe supervision requirement on the automatic switching equipment. In fulfilling these more severe criteria, voice frequency supervision is therefore used to serve not only the trunks, (as is common), but to also serve subscriber lines. In addition, since the signalling on the trunks is compatible with the signalling on the lines, the same receiver can be used for both. It has now been found that by sharing the receiver over a plurality of trunks and lines, one receiver can be used to perform the same function as many.

One of the more difficult supervisory requirements in systems using voice frequency signalling is the provision of equipment which successfully discriminates between a valid supervisory signal and the ambient noise. If in a conversation, for example, a spurious signal occurs which is similar to the release signal and the supervisory equipment does not properly discriminate, the connection will be improperly released. It is important, of course, that such form of release does not occur. In addition to having the capability of reliably recognizing release signals, such equipment must also be capable of discriminating seize signals, acknowledge signals and recall signals from ambient noise.

To insure that spurious or unwanted signals will not result in improper equipment operation, the supervisory receiver unit not only looks at the frequency of each signal, but also checks the level of the signal against the ambient noise energy in the rest of the voice frequency band. In addition, the supervisory receiver unit looks at the signal for a relatively long period of time before any action is taken. This sustained signal criteria for acting upon a signal, of necessity, makes AC voice frequency supervision very slow. DC supervision, on the other hand, will provide more expeditious supervision since it is almost impossible to simulate a steady DC condition for even a very small period of time. Whether AC or DC supervision is used is determined by the external plant. If a physical wire runs to the subscriber, it is preferable to use DC supervision. If the connection is by means of a radio link, then AC supervision is used.

2. DESCRIPTION OF THE PRIOR ART

The standard signalling means in an automatic telephone system normally consists of equipment for effecting AC signalling on all trunks and DC signalling on all lines. Since all trunks in such systems have AC supervision, each trunk also has a dedicated receiver. The lines, however, do not normally have associated receivers since with a pure DC system the supervision problem is not present. In those installations in which AC supervision on a line was required, an external adapter was used to convert the AC to DC. However, in the commercial world, AC supervision of a line by an adapter is the exception. In a military environment, such supervision is more common.

The supervisory signals on a trunk are concentrated, and it is therefore economically feasible to dedicate a receiver to each trunk. However, when faced with the requirement of dedicating a receiver for each line, the size, weight, and economics of the solution are not compatible with other military requirements. It therefore becomes necessary to find a way for a plurality of lines to share at least one receiver.

In previously known telephone systems, AC signalling on the trunk consisted of one frequency which indicated both seize and release, depending upon the timing. This in turn required a complicated telephone set. If the telephone set is to be simplified, two distinct signals must be generated, one for seize and one for release.

SUMMARY OF THE INVENTION

The novel supervisory receiver unit of the present invention has switch and filter circuits over which tone signals are received from the input transformer of a line or trunk. The tone signals are tapped off the secondary of a hybrid transformer and fed to one of a plurality of associated FET switches which are strobed in sequence.

Each FET switch, which is normally biassed off, receives tone from the line at a level below the input to the line. Each FET switch has an associated transistor which is also biased off due to a resistor-rectifier biasing arrangement. When the base of the transistor is grounded by a gating circuit, the transistor is turned on and the FET biasing rectifier is biased off. The FET gate then has effectively zero bias and (being a depletion mode device) is turned on.

With the FET on, a tone signal (if present on the line) is fed over a linear amplifier which provides an output over two discrete paths. The first path extends through filters to one of a plurality of limiters, each of which is associated with one or more tone receivers.

Each tone receiver is comprised of a limiter circuit (which converts a widely varying input level to a constant output and provides a portion of the system voice guard), a frequency selective tank with associated threshold controlled detectors, and turn-on, turn-off time delay circuits.

The limiter circuit provides a constant signal level into selective networks, one for each tone received. A positive feedback loop provides a threshold below which the limiter will not switch, thus reducing the susceptibility of the circuit to crosstalk or other types of noise. A negative feedback loop acts to establish a constant voltage waveform output independent of power supply variations. The limiter guard action in conjunction with the selctive tank threshold controlled detectors provides a guard against false signal detection. Further protection is provided by programming the processor to look for a signal for a plurality of scans.

The second discrete output path from the linear amplifier extends to a threshold detector control circuit which consists of a threshold detector circuit and a switch. With no signal, the switch is turned on. When a signal is present which exceeds a predetermined set value, the detector circuit controls the switch to turn off to thereby enable the detectors which are associated with each of the selective networks.

Although all selective network detectors will be enabled, only certain detector circuits associated with specific frequency selective tanks will have received a signal from a line and will have produced an output. Such output will cause only the associated network to present a logic "0" to the data transfer unit (DTU) for the duration of the sampling period, until the signal received from the line is terminated.

In systems in which the subscriber has DC capability, the same signal that drives the FET circuitry is applied to the DC network. At the same time that the FET is off, the DC network will put out a logic "1." Conversely at the same time that the FET is on, assuming a DC signal is on the line, the DC network will present a logic "0" to the DTU. The DTU, receiving logic "0" impulses from various networks while strobing various FET's and the associated DC network in sequence, will be able to determine which supervisory signal is on each of the subscriber lines, and the particular line on which the signal exists.

It is an object of the present invention to provide a system in which the efficiency and utility of a single supervisory receiver unit is increased by time sharing a plurality of lines.

It is also an object of the invention to provide a supervisory receiver unit which is able to receive and distinguish between an increased number of frequency signals used for supervisory purposes and to indicate the presence thereof to the data transfer unit.

It is a further object of the invention to provide a supervisory receiver unit which services a plurality of lines by time sharing each of the lines, and at the same time distinguishes between a plurality of different supervisory signals which may be received over a single line.

It is an additional object of the invention to provide a system having a common control device which controls the time sharing of each of a plurality of supervisory receiver units, and which is operative to detect information indicating the supervisory signals which are on the lines as sampled at successive time periods.

DESCRIPTION OF THE PREFERRED EMBODIMENT

Figure 1:
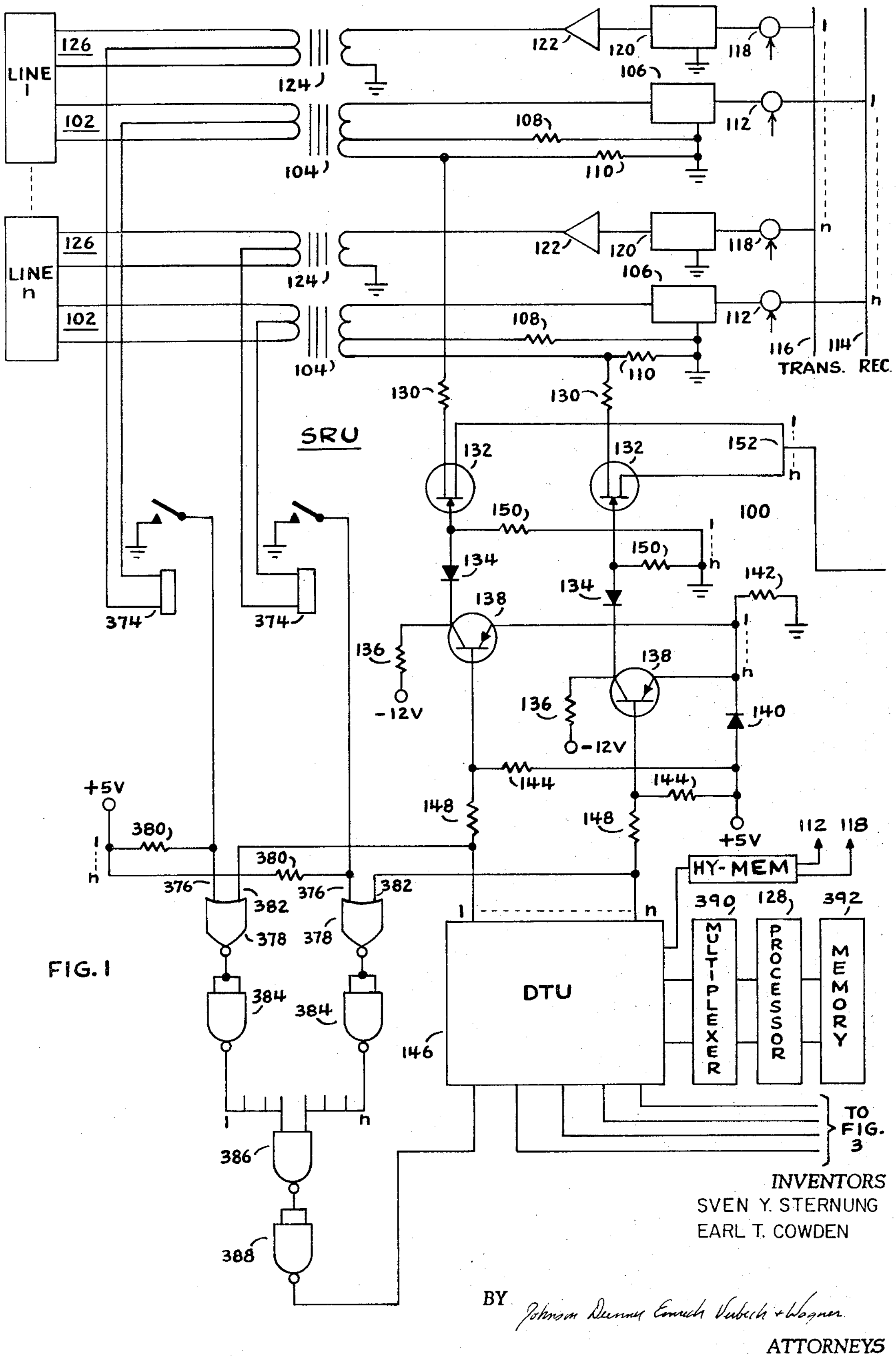
FIG. 1 is a detailed circuit diagram of the switching portion and DC network of the invention.
Figure 2:
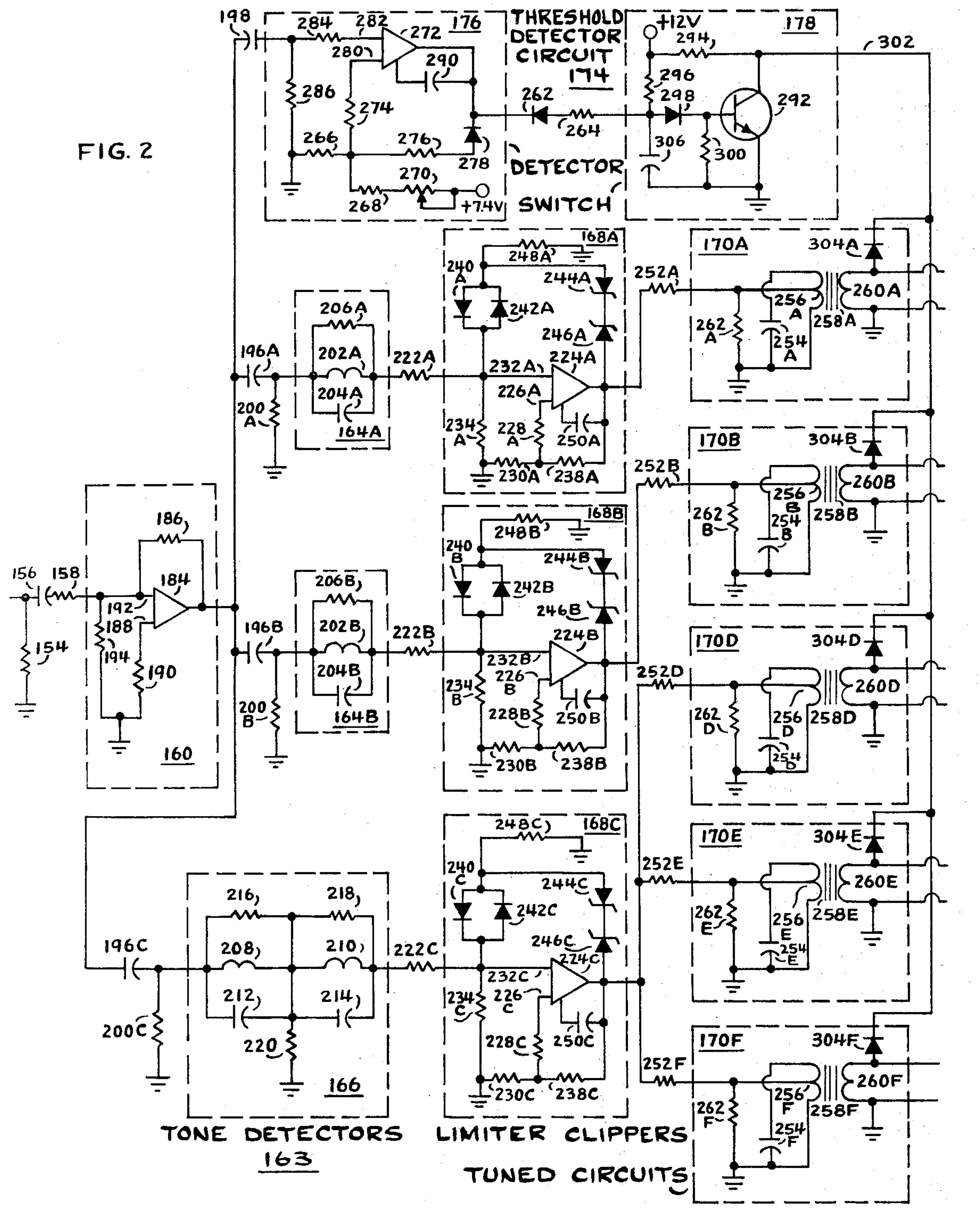
FIG. 2 is a detailed circuit diagram of the threshold detector and a portion of the detector circuit of the invention.
Figure 3:
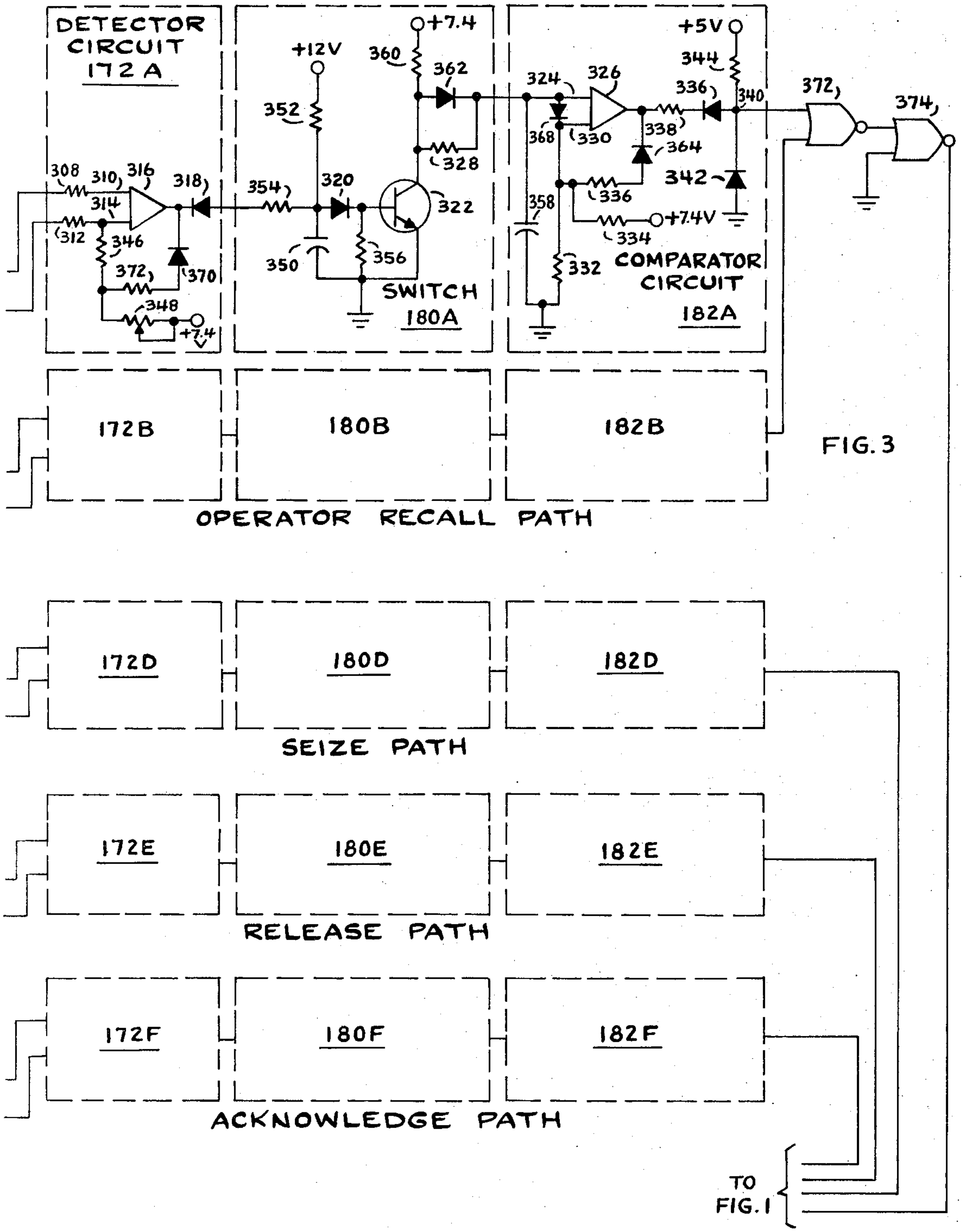
FIG. 3 is a detailed circuit diagram which sets forth the additional circuitry of the detector circuit of the invention.

FIGS. 1, 2 and 3 show a preferred embodiment for carrying out the principles of the invention. As seen in FIG. 1, the supervisory receiver unit (SRU) includes a switching circuit 100 which is connected to a plurality of lines of which only line 1 and line n and their associated circuitry are indicated. As will be shown such lines have associated circuitry which provides supervisory signals including a seize signal and a release signal. The receive or input portion 102 of each line is connected to a three port hybrid transformer 104, consisting of input line 102 as one port; low pass filter 106 and its associated network as a second port; balance resistor 108 and resistor 110 as a third port. Filter 106 is connected through a time division multiplex (TDM) switch 112 to the receive, or incoming, highway 114. In a similar manner the transmit, or outgoing, highway 116 is connected through TDM switch 118, low pass filter 120, amplifier 122, and transformer 124 to the transmit or output portion of each line 126. The low pass filters 106 and 120, and the amplifier 122 may be of the type usually associated with a four wire TDM military switching system.

The TDM switches 112 and 118 are controlled by individual highway memories which in turn are controlled via the DTU and multiplexer by a processor 128.

The supervisory receiver unit (SRU) receives its tone signal from the individual lines by tapping off the secondary of the associated transmission line hybrid transformers 104 through a limiting resistor 130. Limiting resistor 130 provides isolation between the hybrid and the SRU.

Hybrid action provides a constant voltage to the SRU regardless of whether the filter port is properly terminated; that is, whether the TDM switches 112, 118 and the interhighway gate (not shown) are open or not open.

The tone signals derived over each limiting resistor 130 are fed to an associated one of a plurality of field effect transistors (FET) 132, which transistors are normally off because of a −12V potential being fed to the transistor gate through forward biased diode 134 and resistor 136.

Each FET 132 is connected to an individual transistor 138, which is also normally biased off by a common bias arrangement comprised of diode 140 and resistor 142. The bases of each of the transistors 138 are connected over associated resistors 144 to a common +5V potential and are thereby maintained at a higher potential than their emitters to prevent transistors 138 from erroneously turning on.

When the output scan of the data transfer unit (DTU) 146 in accordance with conventional system practice, sequentially places a low going pulse (25 ms every 200 ms) through each current limiting resistors 148 to the base of the associated transistors 138, the gated one of the transistors 138 is turned on. Current flows from the common +5 potential through diode 140 and the gated one of the transistors 138 and resistor 136 to the −12V potential causing the collector of such transistor 138 to become positive and the associated diode 134 to be back-biased thereby placing a ground potential on the associated one of the FET gates 132 through associated resistors 150. DTU 146 thus sequentially controls transistors 138 to sequentially turn on FETs 132 for the successive lines of each terminal.

The output of each of the FETs 132 is connected to a common bus bar 152. The bus bar 152 in turn is connected across a loading resistor 154 (FIG. 2), and through isolation capacitor 156, and resistor 158 to a linear amplifier 160 and through amplifier 160 to a detector circuit 162 shown in FIGS. 2 and 3. Thus as each FET 132 is sequentially turned on, the signals on each of the lines 1 . . . *n* will be sequentially applied over bus 152 to detector circuit 162 and one SRU is operative to serve a larger number of trunks and/or subscriber lines.

In the present embodiment five tones must be detected, and detector circuit 162 includes a separate detecting network for each tone. These five tones are:

| Tone (Hertz) | Designation | Function |
|---|---|---|
| 2,250 | Seize | Call initiating tone |
| 2,600 | Release | Call completion tone |
| 570 | Acknowledge | Trunk confirmation tone |
| 1,209 | Operator Recall ) | |
| 941 | Operator Recall ) | Dual tone, exercised during a call |

Seize and release signals are self-explanatory.

Acknowledge is received when a special trunk is being called. The switchboard receives "seize" from the subscriber and sends "acknowledge" back to the subscriber. The switchboard then sends "seize" to the special trunk and receives "acknowledge" from the trunk. It is the second "acknowledge" which must be detected by the SRU.

Operator recall is a dual tone and two separate networks are provided, one for each of the two tones.

WIth reference to FIG. 2, the output of linear amplifier 160 is shown connected over four paths to a threshold detector circuit 174 and three tone detector networks 163 in detector circuit 162. Each tone detector network consists of a filter, such as band reject filters 164A and 164B, which are provided for the dual tone signals which are used for operator recall, or a dip filter 166 which is provided for the tone signals which are used for seize, release and acknowledge.

The tone output of each filter 164A, 164B, 166 is then fed to an associated limiter clipper 168A, 168B, 168C respectively which transforms the varying input from the associated filter into a constant signal level output. The constant signal level output from limiter clippers 168A and 168B associated with each of the dual tone band reject filters 164A and 164B is fed into associated tuned circuits 170A and 170B, one for each of the dual tones. The constant signal level output from the limiter clipper 168C associated with the dip filter 166 is fed into three tuned circuits 170D, 170E, and

170F, each of the three circuits being tuned for a corresponding one of the three tones associated with seize, release, acknowledge. The signal outputs of the five individual tuned circuits 170A, 170B, 170D, 170E, 170F are in turn fed into associated detector circuits 172A, 172B, 172D, 172E, 172F, shown in FIG. 3.

Besides feeding the individual tone networks, the linear amplifier 160 also feeds a threshold detector circuit 174 (FIG. 2), consisting of a detector 176 and a switch 178, which determines the minimum voltage level to be detected. When this minimum level is detected, the threshold detector circuit 174 enables each of the detector circuits 172A, 172B, 172D, 172E, 172F (FIG. 3). However, for seize, release and acknowledge conditions only one of the detector circuits 172D, 172E, 172F will have received a signal from an associated tuned circuit 170D, 170E, 170F. For an operator recall condition, the two detector circuits 172A and 172B will have received a signal.

When enabled by the threshold detector circuit 174, only the proper detector circuit(s) 172A, 172B, 172D, 172E, or 172F receiving a signal will turn off its associated switch 180A, 180B, 180D, 180E, 180F. This in turn causes its associated comparator circuit 182A, 182B, 182D, 182E, or 182F to indicate to the DTU 146 that there is a tone on the line being sampled, and the specific tone which has been detected.

With reference once more to FIG. 2, a more detailed description of the circuit thereat is now set forth. More specifically, linear amplifier circuit 160 includes a "741 Operational Amplifier" with a feedback resistor 186 connected between its output circuit and one of its input terminals 192. Amplifier 184 has a second input terminal 188 connected through resistor 190 to ground potential. The first terminal 192 is also connected through resistor 158 and isolation capacitor 156 to the common bus 152, and thereby to the output of the line sampling FETs 132. Terminal 192 is also connected to ground through resistor 194. Linear amplifier circuit 160, following the varying signal input from the bus bar 152 provides sufficient gain over DC isolation capacitors 196A, B, C, and filters 164A, 164B, 166 respectively to operate the detector circuit 162, and through capacitor 198 to operate threshold detector circuit 174.

As noted above, separate band reject filters 164A and 164B are provided for each of the two tones of the dual tone used to indicate operator recall. One band reject filter 164A rejects 941 Hz and allows 1209 Hz and other noise frequencies to pass; the other band reject filter 164B rejects 1209 Hz and allows 941 Hz and other noise frequencies to pass. Band reject filters 164A and 164B are such that both networks can operate simultaneously and not voice guard one another.

The other three tones for seize, release, and acknowledge conditions pass through dip filter 166 which is tuned to 570 Hz and 2420 Hz so as to pass 570 Hz, acknowledge; 2250 Hz, seize; and 2600 Hz, release, and also provide voice guard. The dip filter 166 is used to reduce the desired input signal so as to obtain better voice guard of this network group.

Each band reject filter 164A and 164B is preceded by an associated loading resistor 200A, B, and comprises an LC tank circuit consisting of inductor 202A, 202B respectively and capacitor 204A, 204B respectively with added resistance 206A, 206B respectively for a desired Q. The dip filter 166 also is preceded by a loading resistor 200 C and comprises two tank circuits with added resistance, consisting of inductors 208, 210, capacitors 212, 214 and resistors 216, 218. Resistor 220 provides additional loading for the tank circuit.

Resistors 222A, B, C, match the tank circuits of the band reject filters 164A and 164B and the dip filter 166 respectively to their respective limiter clipper circuit 168A, 168B, 168C.

Each of the limiter clipper circuits 168A, B, C, utilize an amplifier such as 224A, similar to that commercially available from Transitron as Model TOA8741W, with one terminal 226A connected through resistors 228A, 230A to ground, and the other terminal 232A, connected to ground through resistor 234A. Resistors 228A, 230A along with resistor 238A, comprise a positive feedback loop providing a threshold below which the limiter will not switch, thus reducing the susceptability of the circuit to crosstalk or other types of noise.

The negative feedback loop comprising diodes 240A, 242A, 244A, 246A and resistor 248A act to establish a constant clamped zener voltage square waveform output of 16 volts peak to peak independent of power supply variations. In this loop, bleeder resistor 248A, connected to ground provides a path for zener leakage current until either diode 240A or 242A is forward biased thus effectively sharpening the zener knee characteristic and thus the output square wave. Compensation capacitor 250A prevents oscillation and provides stability by shaping the response of limiter clipper circuit 168. Limiter clipper circuit 168B and 168C have like components identified by like numbers and corresponding letters.

Limiter clipper circuits 168 are connected by resistors 252A, B, C, D, F, respectively to associated individual tuned circuits 170A, B, D, E, and F. Each tuned circuit, such as 170A, consists of capacitor 254A and the inductance of the primary 256A of transformer 258A which will, through the selectivity of the tank circuit, produce an output of the desired frequency on the secondary 260A. Resistor 262A loads the tank circuit and along with resistor 252A controls the Q of tuned circuit 170A. Tuned circuit 170B, D, E, F operate in a like manner and have like components identified by like numbers.

It will be recalled that linear amplifier circuit 160 in addition to providing signals to the tone detectors 163 also supplies an output which, through a coupling capacitor 198 feeds a threshold control circuit 174 which consists of a threshold detector 176 and diode 262 connected by resistor 264 to a switch 178. The threshold detector 176 determines the minimum voltage level to be detected, the threshold being determined by resistors 266, 268, and potentiometer 270.

Threshold detector 176 uses an amplifier 272 similar to amplifier 224A used in limiter clipper circuit 168A. A positive feedback loop is provided consisting of resistor 274 and a divider network consisting of resistors 266, 276, and diode 278. Resistors 266 and 274 also connect one terminal 280 of amplifier 272 to ground, the other terminal 282 being connected to the output of linear amplifier circuit 160 through resistor 284 and capacitor 198. Resistor 286 provides a DC path to ground. Compensation capacitor 290 provides stability and prevents oscillation by shaping the open loop response of amplifier 272.

The switch 178, comprising transistor 292 is provided with a collector load resistor 294, a base drive resistor 296, diode 298 and a resistor 300 connected from base to ground which acts as a sink to prevent the transistor from erroneously turning on, by providing a leakage path when the transistor is off.

With no signal, or one below threshold, the output of amplifier 272 is at approximately a +12V potential, diode 262 is back biased allowing diode 298 to be forward biased thus turning on transistor 292. With the transistor 292 turned on, near ground potential is placed on conductor 302 to each diode 304A, B, D, E, F in the tuned circuits 170A, B, D, E, F, resulting in one side of secondary windings 260A, B, D, E, F being at near ground potential and the other side being at ground potential. As a result, no signal of sufficient strength is allowed to pass to detector circuits 172A, B, D, E, F.

When a signal above threshold is present at the input to threshold detector 176, amplifier 272 switches to approximately −12V, and diode 262 becomes forward biased and rectifies the negative part of the output of detector 176; capacitor 306 filters the ripple; and diode 298 becomes reverse biased, removing the forward base current applied to the base of transistor 292, thus turning transistor 292 off. As a result, +12V potential is now applied over resistor 294 and line 302 to reverse bias the several diodes 304A, B, D, E, F and thereby enable all of the detector circuits 172A, B, D, E, F (FIG. 3). The frequency signal (or signals) present at the output of tuned circuits 170A, B, D, E, F, is then detected by the corresponding detector circuits 172A, B, D, E, F.

With reference to the illustrated detector circuit 172A, such circuit includes an operational amplifier 316 similar to the amplifier 272 used in detector circuit 176. A first and second terminal 310, 314 are connected over resistors 308, 312 respectively to the transformer output of its associated tuned circuit 170A. The second terminal 314 of amplifier 316 is also connected over resistor 346 and potentiometer 348 to +7.4V potential, and over resistor 372 and diode 370 to the output of amplifier 316. The output of amplifier 316 is also connected over diode 318 to switch 180A. Detector circuits 172B, D, E, F, are of a like structure and connection.

Amplifier 316 has approximately a +12V output in its quiescent state. In such a state, diode 318 is reverse biased allowing diode 320 in switch 180A to be forward biased, turning on transistor 322. A like turn on occurs in each of the switches 180A, B, D, E, F. With transistor 322 conducting, terminal 324 of operational amplifier 326 of comparator circuit 182 is grounded through resistor 328 and transistor 322 of switch 180A. Operational amplifier 326 is similar to the "741 Operational Amplifier" 184 used in linear amplifier circuit 160. The positive voltage on terminal 330 is set by the divider network consisting of resistors 332 and 334 to cause the output of amplifier 326 to be set at approximately +12V, reverse biasing diode 336 which is connected to the output of amplifier 326 over resistor 338. The junction of diode 336, diode 342 and resistor 344 is then held at +5V.

When the input voltage to terminal 310 of amplifier 316 of detector circuits 172A, B, D, E, F is above the threshold level set on associated terminal 314 by an associated divider network consisting of resistors 312,

346 and potentiometer 348 (which potentiometer also controls the band width of the detector), the output of amplifier 316 switches to approximately −12V. Associated diode 318 becomes forward biased, charging associated capacitor 350 to approximately −12V through an associated divider network consisting of resistors 352, 354, diode 318 and the negative swing of amplifier 316. This reverse biasses associated diode 320 allowing switch 180A to turn off. Switches 180B, D, E, F operate in like manner whenever the output of the threshold level detector exceeds the value set by the associated detector 172.

The circuits of switches 180A, B, D, E, F are similar to the circuit of switch 178 in the threshold detector and further description of the component parts is not believed to be necessary. With reference to illustrated switch 180A, resistor 356, connected to ground, acts as a sink to prevent associated transistor 322 from erroneously turning on by providing a leakage path when the transistor is off. With transistor 322 not conducting, capacitor 358 in comparator 182A starts charging toward +7.4V, through associated resistor 360, and forward biased diode 362. Resistor 360 and capacitor 358 set the turn-on delay time of the associate comparator circuits 182A. When capacitor 358 is charged to the threshold of amplifier 326 set on terminal 300 by the reference potential from +7.4V through the divider network consisting of resistors 322 and 334, the output of amplifier 326 switches to approximately −12V. Diodes 336 and 342 become forward biased, clamping junction 340 to near ground potential. With the output of amplifier 326 at approximately −12V, associated diode 364 is forward biased, lowering the voltage on terminal 330 through resistor 336, thus lowering the threshold voltage at which amplifier 326 will switch, enhancing the noise immunity of the circuit. Diode 368 assures a finite differential voltage so that the turn on and turn off delay time can be repeated without having to wait for capacitor 350 to charge to at least five time constants. Diode 370 and resistor 372 assure a signal at the output of detector circuit 172A which has a duration of at least one-fourth cycle of the received voice frequency signal.

When the input signal to the effective detector circuit 172 is terminated, its associated switch 180 is again turned on, and capacitor 358 is discharged through resistor 328 and transistor 322. Resistors 328 and capacitor 358 to make up the turn off delay timing circuit. When capacitor 358 discharges to a voltage just below that on associated terminal 330 and associated amplifier 326 again switches to provide approximately +12V at its output, associated diode 336 becomes reverse biased and associated junction 340 goes to +5V.

The actual turn on and turn off delay times are the sum of the timing circuit and the delay of the individual tone networks caused by the frequency selective tanks 170A, B, D, E, F.

Thus when a signal is present at the input of dip filter 166, for example, the output at the junctions 340D, E, F of the individual tone networks for seize, release and acknowledgement presents a near ground potential to the input of DTU 146 (FIG. 1) to evidence that such signal condition has been detected for the line which is being sampled. This ground potential will last for the duration of the sampling period minus the "on time" of the circuit, plus the "off time" of the circuit.

With an operator recall condition, that is, when a dual tone signal is passed by both reject filters 164A and 164B (FIG. 2), the output of the associated networks at junctions 340A and 340B (not shown) will result in a ground potential input to both terminals of NOR gate 372 (FIG. 3). From the truth table for NOR gates 372 and 374, it can be shown that only when the input to both terminals of NOR gate 372 is at ground potential will the output of NOR gate 374 be at ground potential, indicating a signal to DTU 146 (FIG. 1).

DC SIGNALLING

If a line should be connected to a subscriber who has DC capability then the DC components of the system will be enabled. More specifically, with reference to FIG. 1, only three supervisory signals can be generated by a DC subscriber. Seize and release are generated by the operation of the hook-switch of the instrument at the subscriber line and the resultant state of relay 374 will indicate which signal is being sent. Operator recall is generated by a separate button on the keyset, which button sends a tone over the AC part of the SRU as described above.

When the instrument handset is on-hook, relay 374 will be open. When the line is scanned, terminal 376 of the associated NOR gate 378 will be at a high potential from the +5 volt which is fed across resistor 380 while the other terminal 382 will be at a low potential which is obtained from the output of the DTU 146. With a low and a high input to NOR gate 378, the resulting output of NOR gate 378 (and the input to NAND gate 384) will be low and the resultant output of NAND gate 384 will be high.

When the instrument handset goes off-hook, relay 374 will be closed, grounding terminal 376 of NOR gate 378. When scanned, both terminals of NOR gate 378 will be at a low potential and the resulting output of NAND gate 384 will be low.

One-half of the NAND gates 384 are connected to one terminal of NAND gate 386. The other half of the NAND gates 384 are connected to the other terminal of NAND gate 386.

If on any line being scanned, relay 374 is open, the input to both terminals of NAND gate 386 will be high; the resulting output from NAND gate 388 to DTU 146 will also be high.

If on any line being scanned, relay 374 is closed, the input to one terminal of NAND gate 386 will be low, the other terminal will remain high. The resulting output from NAND gate 388 to the DTU 146 will be low.

When scanning the lines, if the DTU 146 receives a low output from NAND gate 388, it will recognize a seize signal indicating that the subscriber has gone off hook. If the DTU 146 receives a high output from NAND gate 388, it will recognize a release signal indicating that the subscriber has gone on hook.

The DTU 146 transfers the received signals, whether from the AC or DC side of the SRU, through the multiplexer 390 to the processor 128 where it is stored in the memory 392 and appropriate action is taken.

We claim:

1. In an automatic telephone switching system having at least a transmit highway and a receive highway, a plurality of lines over which analog signals including speech and supervisory signals are transmitted, at least certain of said lines having means for providing a first set of voice frequency signals for supervisory purposes including off hook indication signals, and a second set of voice frequency signals for address signalling purposes, a plurality of line coupling circuits, each of which line coupling circuits is connected to a different one of said lines, and each of which has a plurality of switching means associated therewith selectively operative to connect the line coupling circuit for its associated line to said transmit and receive highways, first means in each line coupling means connected between its associated line and at least one of said switching means associated with said line to derive a constant level signal independent of the changing terminal impedances which occur on its associated line with operation of its associated switching means to different conditions, a plurality of supervisory signal receiver means, each of which includes a plurality of analog switching means, an output circuit connected to said analog switching means, second means in each line coupling means for connecting the constant level signal provided by the first means in its line coupling means and the voice frequency signals on its line to an associated one of said analog switching means, means for providing strobe signals in sequence to each one of said analog switching means to control each of said analog switching means to gate the voice frequency signals on its associated line to said output circuit, first means connected to said output circuit for detecting the frequency of only the voice frequency signals of said first set of signals which are gated over said output circuit including said off hook indication signals, and further means controlled by said first means to provide signals which indicate the supervisory signals which were detected in said first set of signals.

2. A system as set forth in claim 1 in which each line comprises a transmit and a receive path, and in which said line coupling circuit comprises a hybrid transformer having a first and second port connected to said receive path, and a third port connected to a circuit which provides said constant level signal to the analog switching means for said line.

3. An automatic telephone switching system as set forth in claim 1 in which others of said lines provide DC supervisory signals, and which includes means for detecting said DC supervisory signals on said other lines, and means for providing an indication of the line and type of supervisory signal detected to said associated equipment.

4. In a time division multiplex automatic telephone switching system having a plurality of lines over which speech and supervisory analog signals are transmitted, and a time division multiplex highway, at least certain of said lines having means for providing a first set of voice frequency signals for line supervision purposes and a second set of voice frequency signals for address signalling purposes, supervisory receiver means for a group of said certain lines including a plurality of analog switching circuits, each of said certain lines having gating means for selectively connecting its line to said highway on a time division basis, filter means connected to said gating means and hybrid transformer means for coupling said gating means and said filter means to its associated line, circuit means connected to said hybrid transformer means to provide a constant voltage over an input path to said analog switching means independent of the changing impedance which occurs on said line with changes in the state of said gating means, common control means for processing detected supervisory signals including means for providing enabling signals to the control circuits of said analog switching circuits in a predetermined pattern, said analog switching means being operative as enabled by said signal to connect the voice frequency signal which appears on its associated line and input path to an output circuit, circuit means connected to said output circuit responsive to only said voice frequency signals of said first set as gated thereto by one of said analog switching circuits to provide logic signals which present the detected ones of the supervisory signals, and output means connected to said circuit means for providing the output logic signals to said common control means.

5. An automatic telephone switching system as claimed in claim 4 in which certain of said voice frequency signals of said first set are assigned to represent predetermined conditions of said lines, and in which said circuit means includes filter network means for detecting said conditions represented by said voice frequency signals of said first set, and means connecting said filter network means to said output circuit for said analog switching circuits, and a threshold detector control circuit connected to said output circuit having means connected to enable said filter network means only in response to occurrence of a minimum signal level of a predetermind minimum value on one of said lines.

6. An automatic telephone switching system as claimed in claim 5 in which each of said filter network means has a turn on delay time and a turn off delay time, and wherein said logic signal provided to said common control means by said output means has a time period determined by the duration of the strobe signal of said analog switching circuit minus said turn on delay time plus said turn off delay time.

7. An automatic telephone switching system as set forth in claim 4 wherein said circuit means includes a plurality of network means for detecting only said voice frequency signals of said first set, and first means for connecting the input of said network means to said output circuit for analog switching circuits, and each of said network means includes a different filter means, each of which is connected to its input means to pass only predetermined ones of said plurality of voice frequency signals, limiter clipper means connected to the output of said filter means, tuned circuit means connected to the output of said limiter clipper means, detector circuit means connected to the output of said tuned circuit means, switch means connected to the output of said detector circuit means, comparator circuit means connected to the output of said switch means, and output means for connecting the output of said comparator circuit means to said common control means.

8. An automatic telephone switching system as set forth in claim 7 wherein said circuit means also includes a threshold control circuit connected to said output circuit having means operative only upon receipt of a set minimum voltage level to enable each of said tuned circuit means.

9. An automatic telephone switching system as set forth in claim 4 in which said circuit means includes a plurality of network means having means connected to said output circuit to detect the frequency signals of said first set gated by said switching circuits to said circuit means, and tuned circuit means connected to said means for detecting the frequency signals to provide a given signal output responsive to receipt of a predetermined one of said voice frequency signals of said first set, and logic circuit means connected to the output of said tuned circuit means for providing a first logic signal output in the absence of a signal from its associated tuned circuit means and enabled by an output signal from its associated tuned circuit means to provide a second logic signal output.

10. An automatic telephone switching system as set forth in claim 9 in which said logic circuit means includes common logic means for providing output logic signals representative of the detected voice frequency signals, input means for connecting the signal output of only a certain group of said network means to the input for said common logic means, and means in said common logic means connected to said input means for providing a predetermined output logic signal only when an input signal is simultaneously provided to the tuned circuit means for each of said network means in said certain group.

11. An automatic telephone switching system as set forth in claim 9 in which each of said certain lines includes means for providing a first voice frequency signal and a second voice frequency signal for operator recall, and in which said plurality of network means includes a first network connected to said output circuit for detecting said first voice frequency signals and a second network for detecting said second voice frequencysignals.

12. In an automatic telephone system as set forth in claim 9 in which said logic circuit means includes further means for providing said second output logic signal only when the frequency signal provided to its associated tuned circuit is of a predetermined duration.

13. In an automatic telephone system having at least a transmit highway and a receive highway and a plurality of transmission lines, each of which lines has a receive and a transmit path, pulse amplitude modulator means associated with said receive path and switching means associated with said receive and transmit paths for selectively connecting its associated line to respective receive and transmit highways, certain of which lines have means for providing a first set of voice frequency signals to indicate different conditions of the line for supervision purposes, and a second set of voice frequency signals of correspondingly different frequencies for address signalling purposes, a hybrid transformer means for each line including a first winding and a second winding connected in said receive path between the line and said pulse amplitude modulator means, and a constant signal circuit connected to said second winding for providing a constant level signal independent of changing impedance on said receive path, supervisory receiver unit means including a plurality of analog switch means, means connecting the input of each of said analog switch means to said constant signal circuit for an associated one of said hybrid transformer means, an output circuit for said analog signal means, circuit means in said supervisory receiver unit means connected to said output circuit, common control means including means for strobing each of said analog switch means in sequence to gate the voice frequency signals on the corresponding transmission lines to pass through said analog switching means and over said output circuit to said circuit means, means in said circuit means connected to said output circuit for converting only said voice frequency signals of said first set of the signals gated thereto by said analog switch means which is of a predetermined amplitude to logic signals which represent said voice frequency signals of said first set, output means for transmitting said logic signals output from said circuit means to said common control means, and means in said common control means connected to enable said analog switch means in a predetermined sequence to provide said logic signals on a time sharing basis.

14. An automatic telephone system as set forth in claim 13 in which at least certain of said transmission lines include a transformer connected in said transmit path and DC supervisory signal detector means capable of detecting a plurality of DC supervisory signals having an input circuit connected to taps on said hybrid transformer and said transformer in said transmit path, said DC supervisory signal detector means comprising at least one switch means connected to said input circuit, logic gating means, and means enabled by said switch means in response to DC supervisory signals on said line to indicate the presence of such signal to said logic gate means.

15. An automatic telephone switching system as set forth in claim 14 in which said logic gating means for said one line includes first logic gate means and second logic gate means, said first logic gate means having a first input terminal connected to the output of said switch means for said line, and a second input terminal connected to the output of the one of said analog switch means which is connected to said line, means connecting the output of said first logic gate means to an input of said second logic gate means, and means connecting the output of said second logic gate means to said common control means to indicate the presence of said one supervisory signal.

16. An automatic telephone switching system as set forth in claim 15 in which said common control means includes means for cyclically strobing said first logic gate means and its associated analog switch means for the different lines in a predetermined sequence, whereby said DC supervisory signal detector means are enabled to indicate to said common control means in sequence the lines which have DC supervisory signals thereon and the identity of said line.

* * * * *

PO-1050
(5/69)

UNITED STATES PATENT OFFICE
CERTIFICATE OF CORRECTION

Patent No. 3,821,484 Dated June 28, 1974

Inventor(s) Sven Y. Sternung and Earl T. Cowden

It is certified that error appears in the above-identified patent and that said Letters Patent are hereby corrected as shown below:

Column 12, line 11, change "present" to -- represent --.

Signed and sealed this 29th day of October 1974.

(SEAL)
Attest:

McCOY M. GIBSON JR.
Attesting Officer

C. MARSHALL DANN
Commissioner of Patents